United States Patent
Salsamendi

(10) Patent No.: US 9,292,417 B2
(45) Date of Patent: Mar. 22, 2016

(54) SYSTEM AND METHOD FOR HYPERVISOR BREAKPOINTS

(71) Applicant: Raytheon Cyber Products, LLC, Herndon, VA (US)

(72) Inventor: Ryan C. Salsamendi, Sunnyvale, CA (US)

(73) Assignee: Raytheon Cyber Products, LLC, Herndon, VA (US)

( * ) Notice: Subject to any disclaimer, the term of this patent is extended or adjusted under 35 U.S.C. 154(b) by 161 days.

(21) Appl. No.: 13/961,190

(22) Filed: Aug. 7, 2013

(65) Prior Publication Data

US 2015/0046908 A1    Feb. 12, 2015

(51) Int. Cl.
| | |
|---|---|
| G06F 9/44 | (2006.01) |
| G06F 11/00 | (2006.01) |
| G06F 9/455 | (2006.01) |
| G06F 12/14 | (2006.01) |
| G06F 11/36 | (2006.01) |
| G06F 21/52 | (2013.01) |
| G06F 21/56 | (2013.01) |

(52) U.S. Cl.
CPC ........ *G06F 11/3664* (2013.01); *G06F 9/45533* (2013.01); *G06F 11/3636* (2013.01); *G06F 11/3644* (2013.01); *G06F 12/145* (2013.01); *G06F 21/52* (2013.01); *G06F 21/566* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 6,154,844 | A | * | 11/2000 | Touboul et al. .................. 726/24 |
| 7,000,225 | B2 | * | 2/2006 | Sangavarapu et al. ........ 717/129 |
| 7,260,815 | B1 | * | 8/2007 | Chen et al. .................... 717/134 |
| 7,506,096 | B1 | * | 3/2009 | Koryakin .............. G06F 12/109 |
| | | | | 711/202 |

(Continued)

FOREIGN PATENT DOCUMENTS

| | | |
|---|---|---|
| EP | 1046995 A2 | 10/2000 |
| WO | WO-2015021011 A1 | 2/2015 |

OTHER PUBLICATIONS

Deng, Z., et al., "SPIDER: Stealthy Binary Program Instrumentation and Debugging via Hardware Virtualization", Purdue University [online], Aug. 8, 2013 [retrieved Sep. 9, 2015], Retrieved from Internet: <URL: http://www.cerias.purdue.edu/apps/reports_and_papers/view/4662>, pp. 1-12.*

(Continued)

*Primary Examiner* — Todd Aguilera
(74) *Attorney, Agent, or Firm* — Schwegman Lundberg & Woessner, P.A.

(57) ABSTRACT

Methods and systems allow the use of hypervisors to use software breakpoints in the same manner as hardware breakpoints. A program to be tested is executed by a hypervisor running a virtual machine. A memory page containing the location of a breakpoint is copied to a temporary memory page. Then a new page is written containing breakpoint instructions at specified memory locations. The new page is tagged as execute only, so the program to be tested is unaware of any changes to the program. If the program attempts to read from the changed memory page, it will read from the temporary memory page instead. Such a method can be used to search websites for malware in relative safety because of the inability of the malware to write to memory locations that are located on a page that is execute only.

23 Claims, 5 Drawing Sheets

(56) References Cited

U.S. PATENT DOCUMENTS

| | | | |
|---|---|---|---|
| 7,555,592 B1* | 6/2009 | Koryakin | G06F 9/45558 711/203 |
| 7,581,085 B1* | 8/2009 | Koryakin | G06F 9/45533 712/220 |
| 7,647,589 B1* | 1/2010 | Dobrovolskiy | G06F 11/3644 710/260 |
| 8,117,600 B1* | 2/2012 | Roeck | G06F 11/3632 714/38.1 |
| 8,285,958 B1* | 10/2012 | Sallam | 711/165 |
| 8,510,756 B1* | 8/2013 | Koryakin | G06F 9/45558 718/1 |
| 8,789,189 B2* | 7/2014 | Capalik et al. | 726/25 |
| 8,832,836 B2* | 9/2014 | Thomas et al. | 726/24 |
| 8,990,627 B2* | 3/2015 | Arapov et al. | 714/38.1 |
| 9,146,767 B2* | 9/2015 | Salsamendi | G06F 9/45558 |
| 2002/0073402 A1* | 6/2002 | Sangavarapu et al. | 717/129 |
| 2006/0069959 A1 | 3/2006 | Schultz | |
| 2009/0327575 A1 | 12/2009 | Durham et al. | |
| 2011/0321165 A1* | 12/2011 | Capalik et al. | 726/25 |
| 2012/0174224 A1* | 7/2012 | Thomas et al. | 726/24 |
| 2013/0132690 A1* | 5/2013 | Epstein | 711/159 |
| 2013/0297849 A1* | 11/2013 | Wagner | 711/6 |
| 2013/0318398 A1* | 11/2013 | Arapov et al. | 714/32 |
| 2013/0340077 A1* | 12/2013 | Salsamendi et al. | 726/23 |
| 2014/0068601 A1* | 3/2014 | Simms et al. | 718/1 |
| 2014/0189687 A1* | 7/2014 | Jung | G06F 9/45558 718/1 |

OTHER PUBLICATIONS

Vasudevan, A., et al., "Stealth Breakpoints", Proceedings of the 21$^{st}$ Annual Computer Security Applications Conference [online], 2005 [retrieved Oct. 27, 2015], Retrieved from Internet: <URL: http://ieeexplore.ieee.org/stamp/stamp.jsp?tp=&arnumber=1565265>, pp. 1-10.*

"International Application Serial No. PCT/US2014/049715, International Search Report mailed Nov. 12, 2014", 4 pgs.

"International Application Serial No. PCT/US2014/049715, Written Opinion mailed Nov. 12, 2014", 7 pgs.

Litty, Lionel, et al., "Hypervisor Support for Identifying Covertly Executing Binaries", *SS'-8 Proceedings of the 17th Conference on Security Symposium*, [online]. [retrieved on Sep. 14, 2011]. Retrieved from the Internet: <URL: https://www.usenix.org/legacy/events/sec08/tech/full_papers/litty/litty.pdf>, (2008),1-16.

* cited by examiner

SYSTEM AND METHOD FOR HYPERVISOR BREAKPOINTS

TECHNICAL FIELD

The present invention relates to computer software and more particularly to the debugging of computer software.

BACKGROUND ART

Computers can be very powerful machines. However, they need software in order to accomplish anything. Part of the development of software involves finding and removing errors in the program, commonly called "bugs." The process of testing software is called debugging the software.

Hence, a need remains for an efficient method of debugging computer software.

BRIEF DESCRIPTION OF THE DRAWINGS

In the drawings, which are not necessarily drawn to scale, like numerals may describe similar components in different views. Like numerals having letter suffixes may represent different instances of similar components. Some embodiments are illustrated by way of example, and not limitation, in the figures of the accompanying drawings in which.

DETAILED DESCRIPTION

Figure 1:
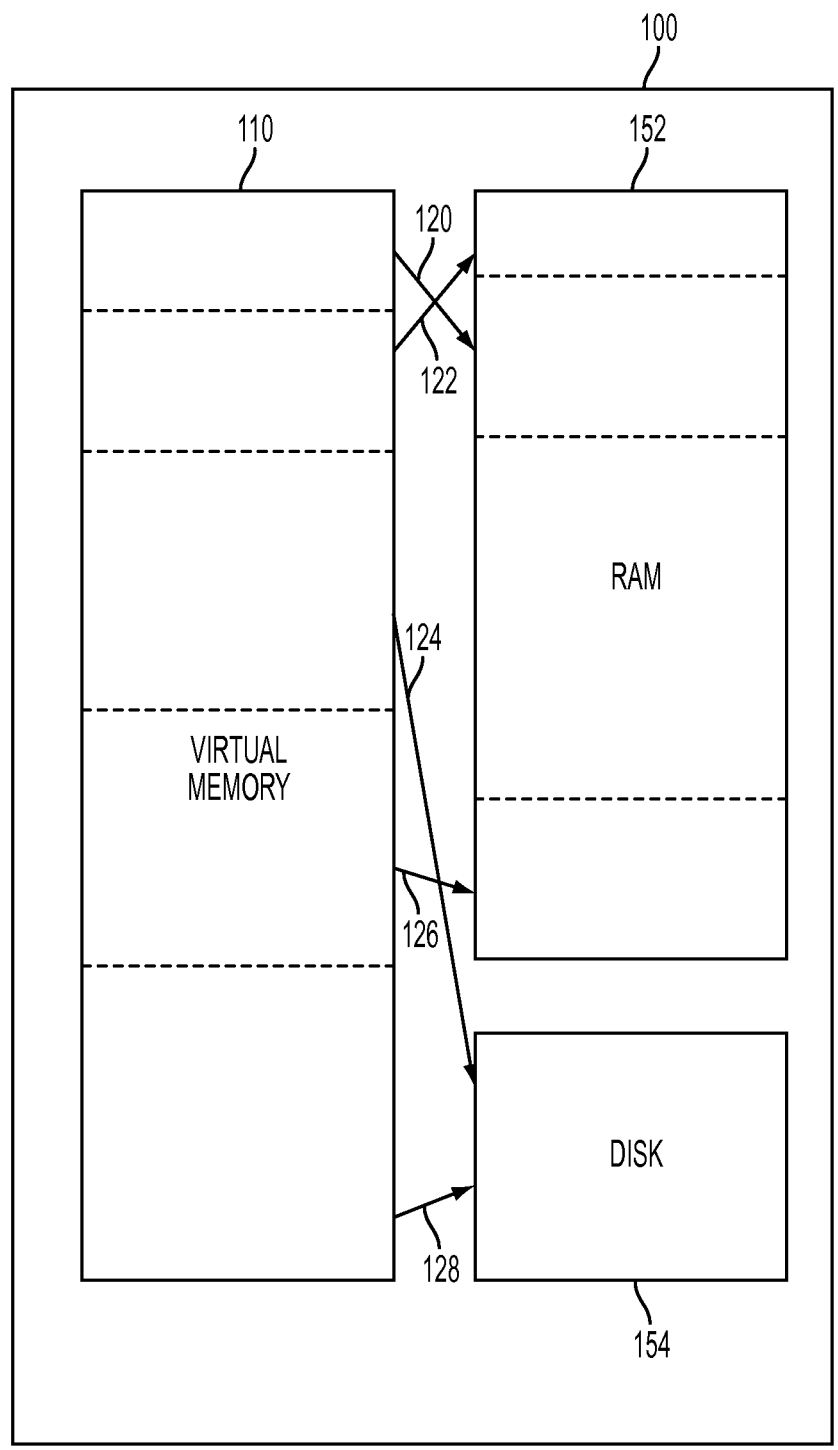
FIG. 1 illustrates an exemplary implementation of virtual memory.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

As described above, during the development of computer software, the developer usually tests the software to ensure the software is functioning properly of the software. This process is called debugging. One common method of debugging software involves the use of breakpoints. A breakpoint stops or pauses a computer program. During this pause or stoppage, a developer examines various pieces of data. For example, the developer can examiner the value of different variables, memory locations, registers, and the like. The developer may also examine files that were opened and acted upon.

Breakpoints may be broken into two different categories: software breakpoints and hardware breakpoints. Software breakpoints are more commonly used because there are more of them available to developers. Software breakpoints are typically placed in code and cause debugging software to halt execution when the breakpoint instruction is reached. This may take place in a number of different ways. For example, in the Intel® x86 architecture, the debugging software overwrites the first byte of the instruction with an INT 3 instruction (0xCC). When the processor encounters the INT 3 instruction, the processor delivers an exception. The debugger traps that exception and stops execution at this point. Thereafter, a developer can commence the debugging, as described above.

In contrast, hardware breakpoints can be more powerful and flexible. In typical usage, there is a hardware register for the processor that can be loaded with a memory location. This memory location may contain the location of a specific instruction where the program is to stop. In the alternative, it may contain the location of a memory location being accessed. In this manner, any attempt to access a certain memory location can trigger a breakpoint.

Limitations of software breakpoints make hardware breakpoints more useful in some circumstances. For example, software breakpoints cause the overwriting of the portions of the code that are being tested. This is not possible in some circumstances, such as when the program being tested is located in a read-only memory (ROM). In addition, the program may be able to determine that portions of the code were changed. This may change the behavior of the program in certain circumstances. For example, when debugging suspected malware such as viruses, worms, Trojan horses and the like, if the malware determines that it is being modified, it can handle the breakpoint itself, instead of allowing the debugger software to handle the breakpoint.

A disadvantage of hardware breakpoints is that there is limit on the number of hardware breakpoints. For example, in the Intel® x86 architecture, one can only have four hardware breakpoints. Other processors have similar limitations as to the number of hardware breakpoints.

A hypervisor is a piece of software that creates and executes virtual machines. The system that is executing the hypervisor is called the "host machine." The hypervisor creates one or more "guest machines" that each have their own operating system ("OS"), presenting a fresh environment for a variety of different uses.

Hypervisors may also be used to isolate a virtual machine from a host machine for security reasons. In such an instance, the created virtual machine may be executing the same OS as the host machine. But the virtual machine has the benefit of isolation from the host machine. An example of such a use would be to diagnose malware—by running the suspected malware on a virtual machine, the host machine does not run the risk of contamination.

There are two main types of hypervisors. A type 1 hypervisor executes directly on the host's hardware to control the hardware and to manage guest OS. A type 2 hypervisor executes within another OS.

A virtual machine is, in essence, a software simulation of another machine (i.e., computer) that executes programs like a physical machine would do. Virtual machines are used in many different situations. For example, a user or an organization might desire both a web server and a file server. Instead of using two different servers, neither of which will be at full utilization most of the time, both the web server and the file server can run on a separate virtual machine within a single server.

Virtual machines may also include programs that emulate other computers, allowing users to execute programs intended for another OS. For example, software such as Parallels® and VMWare Fusion® allows users of the OS X® operating system to run Windows® programs in a virtual machine. Other examples of virtual machines are the numerous video game emulators available that allow one to execute video games on their computer system that are intended for dedicated consoles, such as the Nintendo Entertainment System®. Another type of virtual machine is a process virtual machine. Designed to run a single program, a process virtual machine provides a method to separate one program from other programs running in the system.

Virtual memory is a memory management technique commonly used in many of today's operating systems. With virtual memory, instead of a program directly accessing a physical memory location, the program accesses a virtual memory location. The OS maps the virtual memory to physical memory, such that a program is exposed to a single area of memory. This is illustrated in FIG. 1. A computer 100 is running a program or process and has a physical memory 150 which may comprise RAM 152 and disk 154. The program or process has an area of virtual memory 110 assigned to it. This process can only access virtual memory 110. This process has no direct access to physical memory 150; it only has access to virtual memory 110. Other processes running on computer 100 has no access to virtual memory 110 as they each have their own virtual memory.

Locations in virtual memory 110 are mapped to locations in physical memory 150 via mappings 120, 122, 124, 126, and 128. In this manner, each process may behave as if it has access to a full 4 GB of virtual memory (for a 32-bit process, a 64-bit process may have access to up to 18 Exabytes of virtual memory), even if computer 100 only has 2 GB of RAM and multiple processes are running. Example processes may include user applications (e.g., word processors, games, browsers, and the like) and background processes started by various user applications (e.g., applications for web viewing, such as Flash and Shockwave).

One method of implementing virtual memory is through the use of page tables. Page tables store the mapping of the virtual address seen by underlying programs to the actual physical address where the data is stored. A memory management unit (MMU) handles the translating of virtual addresses to physical addresses. Often, an MMU uses a translation lookaside buffer ("TLB") to store recently used memory mappings from the OS's page table in a cache. When a virtual address is to be translated to a physical address, the TLB is searched first. If a match is found, the TLB returns the physical address and the memory access can proceed. However, if there is no match found, then the mapping has to be determined first, then written to the TLB.

A problem occurs when using virtual machines along with virtual memory. A virtual machine running on a host OS may be executing a guest OS that has its own virtual memory. When a guest OS needs to access memory, it sees page tables that run on an emulated MMU. These tables give the guest OS the illusion that it can translate the guest OS addresses into real physical addresses. However, in reality, the virtual memory manager is dealing with this memory management out of sight of the guest OS. The real page tables are hidden and managed by the virtual memory manager and still run on the real MMU. So each time a guest OS modifies page mapping, the virtual MMU of the guest OS will trap the modification and make its own modifications to the real MMU. This can cause a problem because, for memory intensive applications, memory management causes the largest portion of the performance penalty encountered in using virtual machines.

Figure 2:
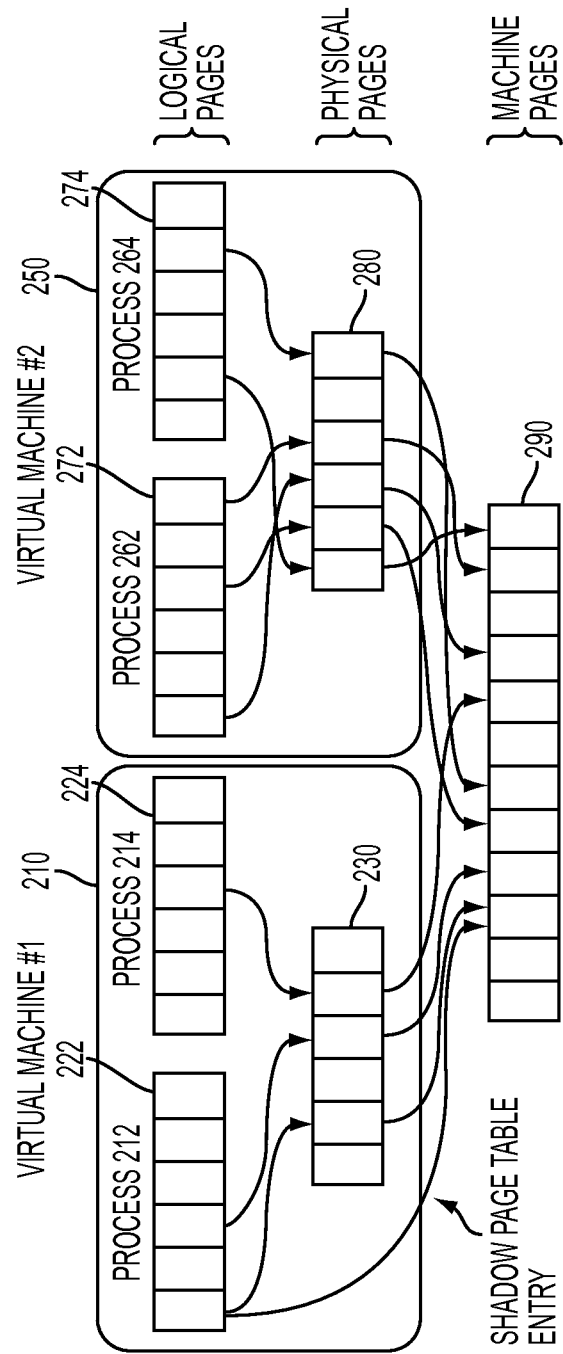
FIG. 2 illustrates another exemplary implementation of virtual memory.

This concept (also known as shadow page tables) is illustrated in FIG. 2. A computer 200 is shown executing a virtual machine 210 and a virtual machine 250. Virtual machine 210 is running two processes 212 and 214, each of which has access to a virtual memory—virtual memory 222 and virtual memory 224. Within virtual machine 210, these virtual memories are mapped to a memory 230. However, because virtual machine 210 is running within computer 200, the memory 230 is further mapped to a machine memory 290 of computer 200. A similar process occurs with virtual machine 250, which runs two processes 262 and 264 that access virtual memories 272 and 274, which are mapped to a "physical" memory 280. Computer 200 then translates "physical" memory 280 locations to machine memory 290. The translation of the virtual memory (such as virtual memory 222) to machine memory 290 is considered a "shadow page table."

To solve this problem, various manufacturers developed the concept of nested page tables. Different manufacturers use different terminology for nested page tables. For example, AMD® uses the term "Rapid Virtualization Indexing" for its implementation of nested page tables. Intel® uses the term "Extended Page Table" for its implementation. Other manufacturers may have their own name for nested page tables. However, it should be understood that the concept of nested page tables may be used, no matter what term the manufacturer uses.

Nested page tables use a large TLB that keeps track of both the guest OS memory management and the memory management needs of the host OS. The TLB keeps track of virtual memory as seen by the guest OS by use of an address space identifier. Therefore, the hypervisor no longer has to sync a shadow page table to the physical memory locations.

The use of nested page tables drastically reduces the penalty encountered by a memory miss—the TLB does not have to be flushed as often because the TLB is much larger than in the shadow page table example. The efficiencies of nested page tables increases as the number of virtual machines increases.

Some implementations of nested page tables include a feature called split permissions. Split permissions allow each page of memory to have its own set of permissions. Example permissions may include read/write/execute; read only; read/write only; and execute only. If a page of memory has read only permissions, the guest OS can only read from memory locations within that page. All attempts to write to a location in that page or execute code on that page would not be allowed. If a page of memory has its permissions set to execute only, then the guest OS would be permitted to execute instructions located in that page, but any other attempts to read or write to that location would be intercepted by the hypervisor.

One method of using such a feature involves using an execute-only page as a breakpoint. When a read or write is attempted to a specific location, that instruction is intercepted by the hypervisor. The hypervisor can then replace any (or all) bytes on the page without the guest program being aware of the change. The bytes on the page being read can be replaced by a software breakpoint instruction (such as INT 3, or 0xCC, the Intel® x86 instruction for software breakpoints).

Although a software breakpoint is being called, it behaves, in essence, like a hardware breakpoint, in that the breakpoint is called when a memory location is accessed, as opposed to being called at a specific instruction in code. However, unlike hardware breakpoints, there is no set limit on the number of these types of breakpoints that can be used. So instead of being limited to only four hardware breakpoints, one can set a breakpoint at any number of memory locations.

Figure 3:
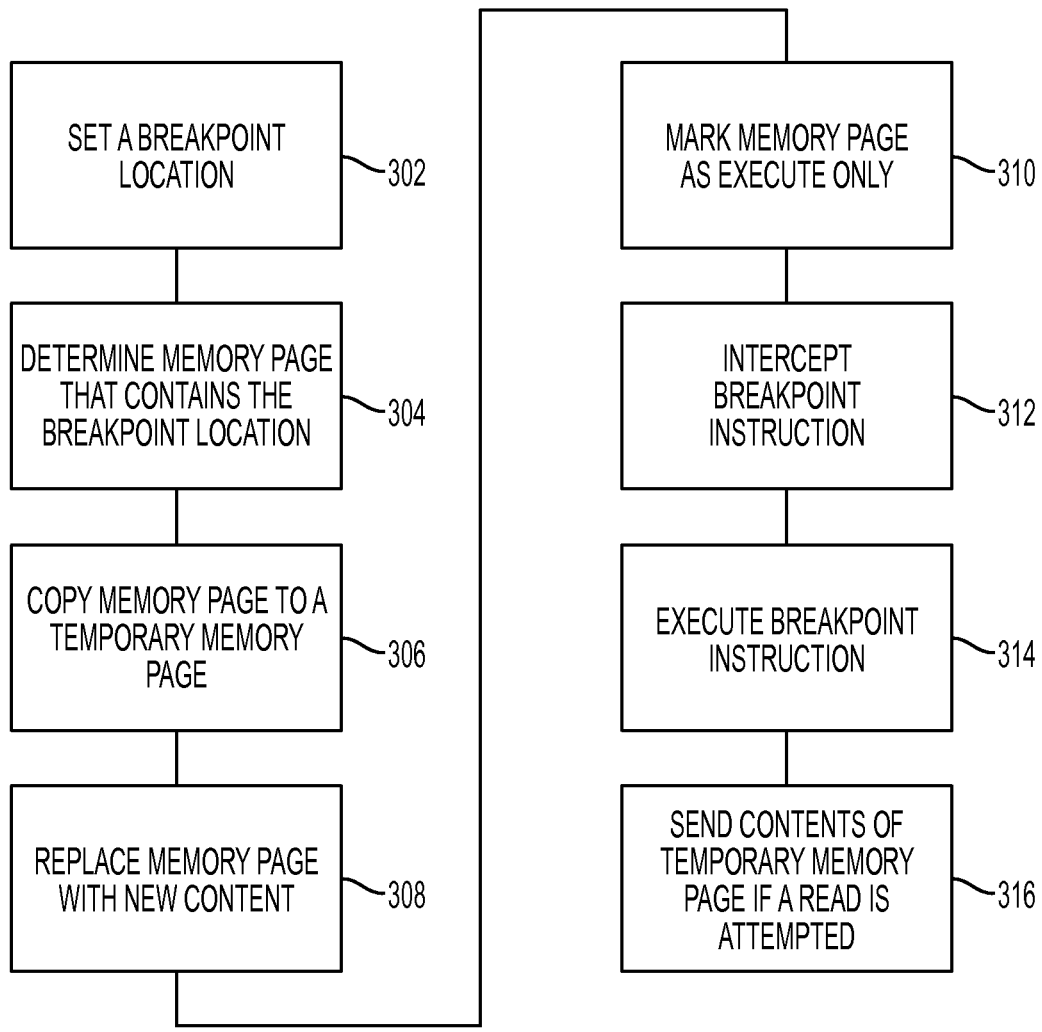
FIG. 3 is a flow chart illustrating the operation of an embodiment.

FIG. 3 presents a flow chart illustrating the operation of an embodiment. A guest program is running on a hypervisor. A developer marks a specific memory location as a breakpoint location (302). This specific memory location may be a memory location that stores a portion of the guest program. In the alternative, the memory location may be a known area that a developer wishes to monitor. The hypervisor determines the page that contains this specific memory location (304). The hypervisor copies the original content of the page that that contains the specific memory location to a different, temporary memory location (306), and replaces the original content with new content (308). The page where the new content is located is marked as execute only (310). The guest program is unaware of this replacement, because the guest program is not permitted to read from this memory location or write to this memory location. The guest program is only permitted to execute instructions that are located on that page.

The new content may include one or more breakpoint instructions, such as INT 3, on a processor using an Intel® x86 instruction set. When the guest program attempts to execute the breakpoint instruction, the hypervisor intercepts the breakpoint instruction (312). Thereafter, the hypervisor handles the breakpoint instruction in the same manner it would handle a typical breakpoint instruction (314). That is, the execution of the program stops and a developer may examine various memory locations in an attempt to debug the guest program. Any attempts to read the page are intercepted and the original page is swapped back in place with the execute permission cleared (316). This hides the fact that portions of the program were replaced with breakpoint instructions.

While embodiments may be used in the same manner as traditional breakpoints, as described, above, the flexibility provided by hypervisor breakpoints allow many more use cases. For example, breakpoint locations may be set in kernel memory space, allowing a user to find vulnerabilities in the machine. In a typical computer, memory may be divided into kernel memory, where the operating system executes, and user memory, where all other programs and user data resides. Traditional breakpoints cannot be set in kernel memory space, only in the user memory space. However, the use of hypervisors allows the setting of a breakpoint on any memory page, including kernel memory.

Figure 4:
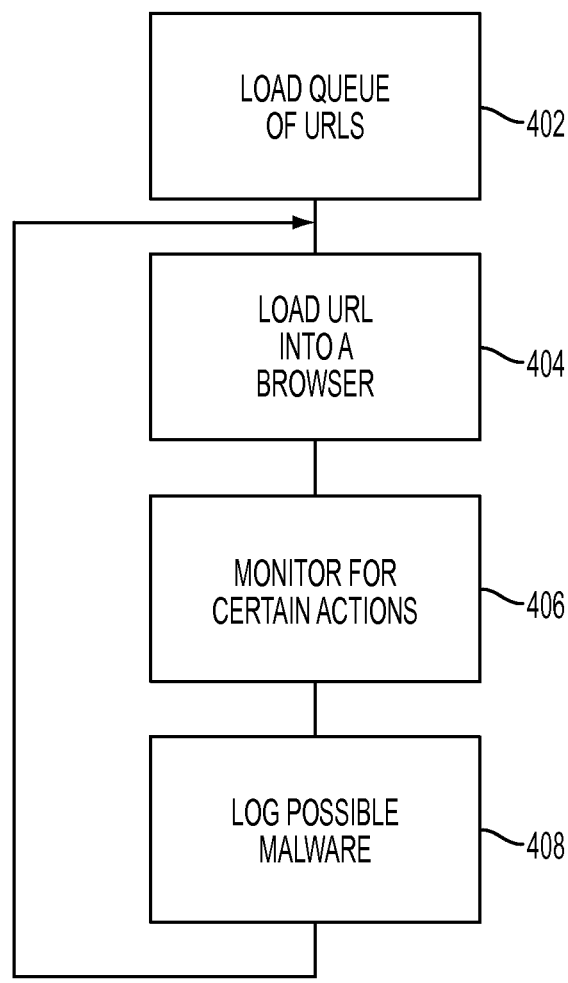
FIG. 4 is a flow chart illustrating the operation of another embodiment.

With reference to FIG. 4, a flowchart illustrating an automated manner of checking websites for malware is presented. A queue of Uniform Resource Locators (URLs) to be examined is loaded into the virtual machine (402). These URLs may point to websites that are suspected to contain malware. In the alternative, the URLs may be selected in another manner, such that checking for malware may be done for maintenance purposes. Thereafter, a URL from the queue is loaded into a browser operating within the virtual machine (404). A breakpoint is triggered within the hypervisor when certain actions take place that are indicative of malware (406). The breakpoint uses methods described above to operate. Such actions that may be monitored include, but are not limited to: the reading/writing of files on the virtual machine; attempts to access the registry of the virtual machine; the creation of process on the virtual machine; the loading of a Dynamic Link Library (DLL); and the like. The actions may be written to a log (408), then another website is loaded from the queue and the process starts over again.

In such a manner, a series of questionable websites may be examined with a lessened danger of infecting the host computer. There are several layers of protection from malware in such a setup. First, because the method of FIG. 4 is executing on a virtual machine, any malware would be on the virtual machine, not the host machine. Any malware can thus be removed merely by removing the virtual machine from the host machine. Second, the breakpoints in the hypervisor can be set up to not only detect attempts at installing or executing malware, the breakpoints can prevent such attempts (e.g., through the use of execute-only pages that do not allow the malware to read or write to certain pages of memory) and not allow the malware know that the attempt to install or execute malware failed.

Another possible use is to determine if a program is terminating properly. In this use case, breakpoints can be set on various areas of kernel memory that are responsible for specific registry read/writes and/or memory read/writes. Thereafter, when a program is terminated, if those specific registry read/writes and/or memory read/writes occur, then a breakpoint can be implemented and one can determine exactly what is happening when the program terminates.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 5:
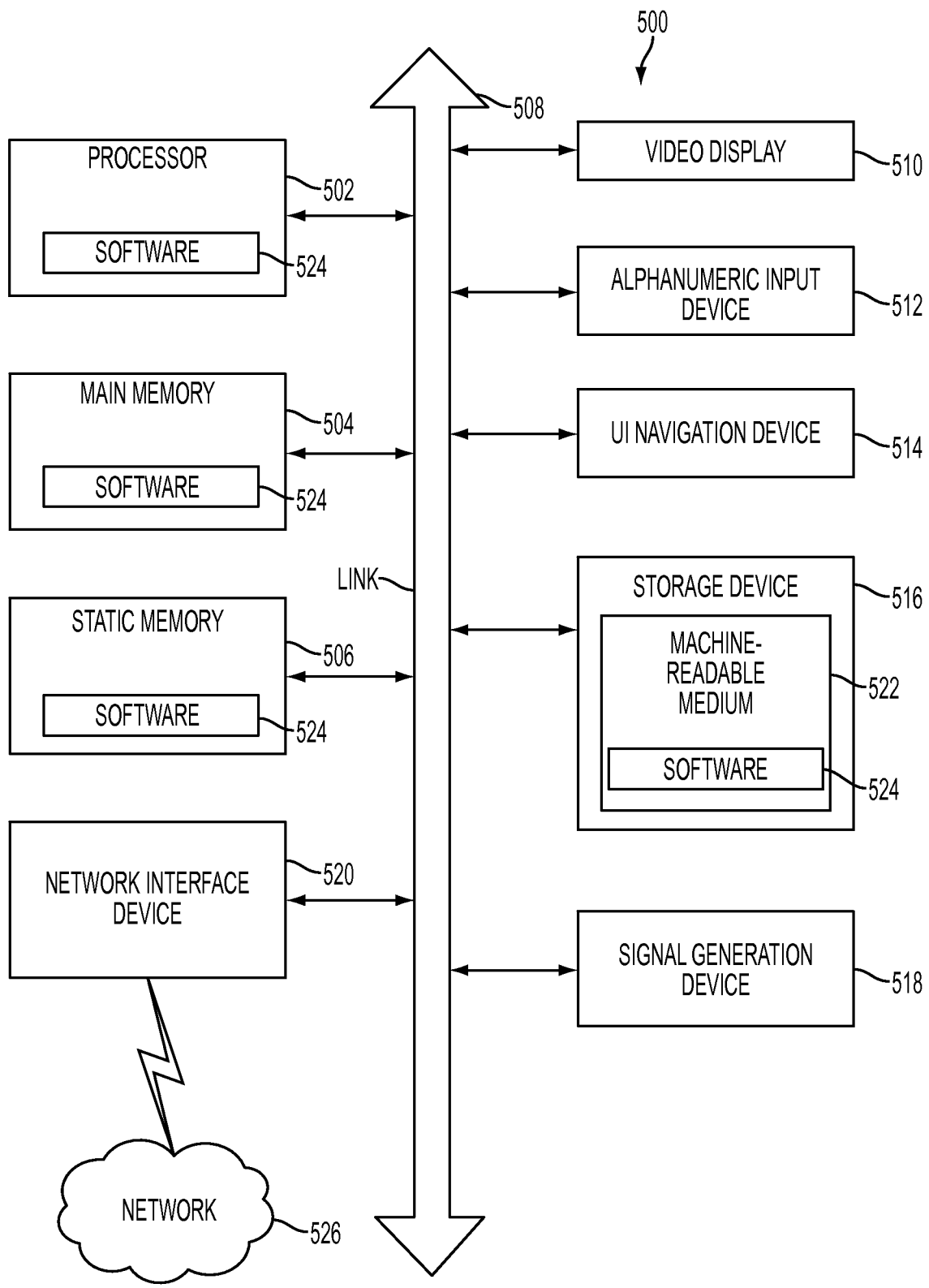
FIG. 5 is a block diagram illustrating an exemplary machine capable of operating an embodiment.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse or track pad). In an example, the display device 510, input device 512 and UI navigation device 514 may be a touch screen display that accomplishes all three tasks. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that is arranged to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM, DVD-ROM, and Blu-Ray disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The embodiments described above with reference to FIG. 1 through FIG. 5 include:

Example 1 is a method for debugging a computer program comprising: selecting a first memory location as a breakpoint location; determining a first memory page that contains the first memory location; replacing at least a portion of the first memory page with new content, the new content including a breakpoint instruction; and setting the permission of the first memory page to execute only, such that attempts to read to or write from the first memory page by the computer program are prevented.

In example 2, the subject matter of example 1 may optionally further comprise: copying the contents of the first memory page to a temporary memory page.

In example 3, the subject matter of example 2 may optionally further comprise: when the computer program attempts to read from the first memory location, sending the computer program data from the temporary memory page.

In example 4, the subject matter of example 4 may optionally further comprise: replacing at least a portion of the temporary memory page with new content, the new content including a breakpoint instruction; and setting the permission of the temporary memory page to execute only, such that attempts to read to or write from the temporary memory page by the computer program are prevented.

In example 5, the subject matter of example 4 may optionally further comprise: during an execution of the computer program, redirecting attempts to execute instructions located in the first memory page to the temporary memory page.

In example 6, the subject matter of example 1 may optionally further include wherein the method is performed within a virtual machine being controlled by a hypervisor.

In example 7, the subject matter of example 1 may optionally further include wherein the breakpoint instruction is an INT 3 instruction.

Example 8 is a machine-readable medium that stores instructions which, when executed by a machine device, causes the machine to perform operations comprising: selecting a first memory location as a breakpoint location; determining a first memory page that contains the first memory location; replacing at least a portion of the first memory location with new content, the new content including a breakpoint instruction; wherein, the first memory page is marked as execute only, such that attempts to read from or write to the first memory page are prevented.

In example 9, the subject matter of example 8 may optionally further comprise instructions that cause the machine to perform operations further comprising: copying the contents of the memory page to a temporary memory page.

In example 10, the subject matter of example 9 may optionally further comprise instructions that cause the machine to perform operations further comprising: when the computer program attempts to read from the first memory location, sending the computer program data from the temporary memory page.

In example 11, the subject matter of example 9 may optionally further comprise instructions that cause the machine to perform operations further comprising: replacing at least a portion of the temporary memory page with new content, the new content including a breakpoint instruction; and setting the permission of the temporary memory page to execute only, such that attempts to read to or write from the temporary memory page by the computer program are prevented.

In example 12, the subject matter of example 9 may optionally further comprise instructions that cause the machine to further perform operations further comprising: during an execution of the computer program, redirecting attempts to execute instructions located in the first memory page to the temporary memory page.

In example 13, the subject matter of example 8 may optionally further comprise instructions that cause the machine to further perform operations further comprising: executing a virtual machine controlled by a hypervisor, wherein the steps of selecting, determining, copying, and replacing are performed within the virtual machine.

Example 14 is a system for debugging a computer program comprising: memory, divided into pages including at least a first memory page; a processor coupled to the memory; wherein the processor is arranged to: select a first memory location as a breakpoint location; determine a first memory page that contains the first memory location; replace at least a portion of the first memory page with new content, the new content including a breakpoint instruction; set the permission of the first memory page to execute only, such that attempts to read to or write from the first memory page by the computer program are prevented;

In example 15 the subject matter of example 14 may optionally further include wherein the processor is further arranged to copy the contents of the first memory page to a temporary memory page.

In example 16, the subject matter of example 15 may optionally further include wherein the processor is further arranged to, when the computer program attempts to read from the first memory location, send the computer program data from the temporary memory page.

In example 17, the subject matter of example 15 may optionally further include wherein the processor is further arranged to: replace at least a portion of the temporary memory page with new content, the new content including a breakpoint instruction; and set the permission of the temporary memory page to execute only, such that attempts to read to or write from the temporary memory page by the computer program are prevented.

In example 18, the subject matter of example 17 may optionally further include wherein the processor is further arranged to: during an execution of the computer program, redirect attempts to execute instructions located in the first memory page to the temporary memory page.

In example 19, the subject matter of example 14 may optionally further include a hypervisor arranged to execute on the processor.

In example 20, the subject matter of example 14 may optionally further include wherein the breakpoint instruction is an INT 3 instruction.

Example 21 is a method for determining the existence of malware on websites comprising: using a browser that is executing on a virtual machine to load a website into a browser; setting a breakpoint to detect indicia of malware; and logging any detected indicia of malware.

In example 22, the subject matter of example 21 may optionally further include wherein setting a breakpoint comprises: selecting a first memory location as a breakpoint location; determining a first memory page that contains the first memory location; replacing at least a portion of the first memory page with new content, the new content including a breakpoint instruction; setting the permission of the first memory page to execute only, such that attempts to read to or write from the first memory page by the website are prevented.

In example 23, the subject matter of example 22 may optionally further comprise: copying the contents of the first memory page to a temporary memory page.

In example 24, the subject matter of example 23 may optionally further comprise: when the website attempts to read from the first memory location, sending data from the temporary memory page to the website.

In example 25, the subject matter of example 23 may optionally further comprise: replacing at least a portion of the temporary memory page with new content, the new content including a breakpoint instruction; and setting the permission of the temporary memory page to execute only, such that attempts to read to or write from the temporary memory page by the website are prevented.

In example 26, the subject matter of example 25 may optionally further comprise: during a visit to the website, redirecting attempts to execute instructions located in the first memory page to the temporary memory page.

In example 27, the subject matter of example 21 may optionally further include wherein indicia of malware include an attempt to write to a registry; an attempt to load a Dynamic Link Library; an attempt to create a process; and an attempt to read or write to specific memory locations.

Thus, the present invention has been described herein with reference to a particular embodiment for a particular application. Those having ordinary skill in the art and access to the present teachings will recognize additional modifications, applications, and embodiments within the scope thereof.

The particular implementations shown and described are illustrative of the invention and its best mode and are not intended to otherwise limit the scope of the present invention in any way. Indeed, for the sake of brevity, conventional data processing, data transmission, and other functional aspects of the system may not be described in detail. Furthermore, the connecting lines shown in the various figures are intended to represent functional relationships and/or physical couplings between the various elements. Many alternative or additional functional relationships or physical connections may be present in a practical system.

In the foregoing description, the invention has been described with reference to specific exemplary embodiments.

However, it will be appreciated that various modifications and changes may be made without departing from the scope of the present invention as set forth herein. The description and figures are to be regarded in an illustrative manner, rather than a restrictive one, and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

It is therefore intended by the appended claims to cover any and all such applications, modifications and embodiments within the scope of the present invention.

What is claimed is:

1. A method for debugging a computer program comprising:
   selecting, in a virtual machine controlled by a hypervisor in a host operating system, a guest memory location as a breakpoint location;
   determining, in the virtual machine, a first memory page that contains the guest memory location;
   replacing, by the hypervisor without knowledge by a computer program executed by the virtual machine, at least a portion of the first memory page with new content, the new content including a breakpoint instruction;
   translating virtual memory to physical memory; and
   in response to the replacing, setting a permission of the first memory page to execute only, such that attempts to read to or write from the first memory page by the computer program are intercepted by the hypervisor.

2. The method of claim 1 further comprising:
   copying contents of the first memory page to a temporary memory page.

3. The method of claim 2 further comprising:
   when the computer program attempts to read from the guest memory location, sending the computer program data from the temporary memory page.

4. The method of claim 2 further comprising:
   replacing at least a portion of the temporary memory page with new content, the new content including a breakpoint instruction; and
   setting the permission of the temporary memory page to execute only, such that attempts to read to or write from the temporary memory page by the computer program are prevented.

5. The method of claim 4 further comprising:
   during an execution of the computer program, redirecting attempts to execute instructions located in the first memory page to the temporary memory page.

6. The method of claim 1 wherein the breakpoint instruction is an INT 3 instruction.

7. A non-transitory machine-readable medium that stores instructions which, when executed by a machine, causes the machine to perform operations comprising:
   selecting, in a virtual machine controlled by a hypervisor in a host operating system, a guest memory location as a breakpoint location;
   determining, in the virtual machine, a first memory page that contains the guest memory location;
   replacing, by the hypervisor without knowledge by a computer program executed by the virtual machine, at least a portion of the first memory page with new content, the new content including a breakpoint instruction;
   translating virtual memory to physical memory; and
   in response to the replacing, setting a permission of the first memory page to execute only, such that attempts to read to or write from the first memory page by the computer program are intercepted by the hypervisor.

8. The non-transitory machine-readable medium of claim 7 further comprising instructions that cause the machine to perform operations further comprising:
   copying the contents of the first memory page to a temporary memory page.

9. The non-transitory machine-readable medium of claim 8 further comprising instructions that cause the machine to perform operations further comprising:
   when a computer program being debugged attempts to read from the guest memory location, sending the computer program data from the temporary memory page.

10. The non-transitory machine-readable medium of claim 8 further comprising instructions that cause the machine to perform operations further comprising:
    replacing at least a portion of the temporary memory page with new content, the new content including a breakpoint instruction; and
    setting the permission of the temporary memory page to execute only, such that attempts to read to or write from the temporary memory page by the computer program are prevented.

11. The non-transitory machine-readable medium of claim 8 further comprising instructions that cause the machine to further perform operations further comprising:
    during an execution of a computer program being debugged, redirecting attempts to execute instructions located in the first memory page to the temporary memory page.

12. A system for debugging a computer program comprising:
    memory, divided into pages including at least a first memory page;
    a processor coupled to the memory;
    wherein the processor is arranged to:
      select, in a virtual machine controlled by a hypervisor in a host operating system, a guest memory location as a breakpoint location;
      determine, in the virtual machine, the first memory page that contains the guest memory location;
      replace, by the hypervisor without knowledge by a computer program executed by the virtual machine, at least a portion of the first memory page with new content, the new content including a breakpoint instruction;
      translate virtual memory to physical memory; and
      in response to the replace, set the permission of the first memory page to execute only, such that attempts to read to or write from the first memory page by the computer program are intercepted by the hypervisor.

13. The system of claim 12 wherein the processor is further arranged to:
    copy the contents of the first memory page to a temporary memory page.

14. The system of claim 13 wherein the processor is further arranged to:
    when the computer program attempts to read from the guest memory location, send the computer program data from the temporary memory page.

15. The system of claim 13 wherein the processor is further arranged to:
- replace at least a portion of the temporary memory page with new content, the new content including a breakpoint instruction; and
- set the permission of the temporary memory page to execute only, such that attempts to read to or write from the temporary memory page by the computer program are prevented.

16. The system of claim 15 wherein the processor is further arranged to:
- during an execution of the computer program, redirect attempts to execute instructions located in the first memory page to the temporary memory page.

17. The system of claim 12 wherein the breakpoint instruction is an INT 3 instruction.

18. A method for determining the existence of malware on websites comprising:
- using a browser that is executing on a virtual machine to load a website into a browser;
- setting a breakpoint to detect indicia of malware; and
- logging any detected indicia of malware;
- wherein setting the breakpoint comprises:
  - selecting, in a virtual machine controlled by a hypervisor in a host operating system, a guest memory location as a breakpoint location;
  - determining, in the virtual machine, a first memory page that contains the guest memory location;
  - replacing, by the hypervisor without knowledge by a computer program executed by the virtual machine, at least a portion of the first memory page with new content, the new content including a breakpoint instruction;
  - translating virtual memory to physical memory; and
  - in response to the replacing, setting a permission of the first memory page to execute only, such that attempts to read to or write from the first memory page by the computer program are intercepted by the hypervisor.

19. The method of claim 18 further comprising:
- copying the contents of the first memory page to a temporary memory page.

20. The method of claim 19 further comprising:
- when the website attempts to read from the guest memory location, sending data from the temporary memory page to the website.

21. The method of claim 19 further comprising:
- replacing at least a portion of the temporary memory page with new content, the new content including a breakpoint instruction; and
- setting the permission of the temporary memory page to execute only, such that attempts to read to or write from the temporary memory page by the website are prevented.

22. The method of claim 21 further comprising:
- during a visit to the website, redirecting attempts to execute instructions located in the first memory page to the temporary memory page.

23. The method of claim 18 wherein indicia of malware include an attempt to write to a registry; an attempt to load a Dynamic Link Library; an attempt to create a process; and an attempt to read or write to specific memory locations.

* * * * *